United States Patent [19]

Masuda et al.

[11] Patent Number: 5,462,325
[45] Date of Patent: Oct. 31, 1995

[54] BUMPER REINFORCEMENT AND MANUFACTURING METHOD THEREFOR

[75] Inventors: Mitsuo Masuda; Hiroshi Fujii, both of Shizuoka, Japan

[73] Assignee: Yamakawa Industrial Co., Ltd., Fuji, Japan

[21] Appl. No.: 208,144

[22] Filed: Mar. 10, 1994

[30] Foreign Application Priority Data

Jan. 13, 1994 [JP] Japan .................................. 6-014095

[51] Int. Cl.⁶ .................................................... B60R 19/02
[52] U.S. Cl. ............................................ 293/102; 293/121
[58] Field of Search .................................. 293/102, 120, 293/121, 122, 132, 154, 155; 296/188, 189

[56] References Cited

U.S. PATENT DOCUMENTS

| 1,854,710 | 4/1932 | Mayer | 296/189 |
| 3,374,495 | 3/1968 | Joyce | 293/102 X |
| 4,116,480 | 9/1978 | Crestetto | 293/102 |
| 4,684,151 | 8/1987 | Drewek | 296/189 X |
| 5,118,160 | 6/1992 | Kitagawa et al. | 296/189 |

FOREIGN PATENT DOCUMENTS

| 171357 | 7/1990 | Japan | 293/102 |
| 4063775 | 2/1992 | Japan | 296/189 |

*Primary Examiner*—Dean Kramer
*Attorney, Agent, or Firm*—Foley & Lardner

[57] ABSTRACT

A bumper reinforcement has a reinforcement main body (2) made of a long panel (3) having a trough-shaped cross-section along its whole length, a plurality of ridges (6) each expanding toward an open longitudinal side of the panel (3) are made on opposing faces of end portions of the reinforcement main body (2), resulting in curved end portions (5) of the reinforcement main body (2). Parallel beads (12) for controlling anti-buckling strength of the reinforcement are formed on opposing faces of an intermediate portion of the reinforcement main body except for its end portions.

4 Claims, 4 Drawing Sheets

BUMPER REINFORCEMENT AND MANUFACTURING METHOD THEREFOR

TITLE OF THE INVENTION

BACKGROUND OF THE INVENTION

1. Field of the Invention

The present invention relates to a bumper reinforcement and a manufacturing method for the bumper reinforcement.

2. Description of the Prior Art

One of conventional bumper reinforcements will be described with reference to the drawings of FIG. 7, FIG. 8A, FIG. 8B, and FIG. 9.

As shown, a bumper reinforcement(a) is attached to a part of the vehicle body by means of a bumper facer (not shown), so that it is necessary to curve both end portions of the bumper reinforcement according to the curvature of the end portion of the bumper facer. The bumper reinforcement(a) has a sectional shape of a hat and is provided with a main body of the reinforcement(b) and flanges(e). When the bumper reinforcement(a) of such configuration is bent, cut-out portions(c) are formed at both ends of the reinforcement and outside material(d) is extended and squeezed inwardly.

The conventional bumper reinforcement(a) is made of high tension steel of 60kg or 80kg. Recently, 100kg or 120kg high tension steel has been used to make the reinforcements in order to make the product lightweight. Other bumper reinforcement having trough-like section have been made with similar methods.

According to the conventional manufacturing method, the bumper reinforcement(a) is manufactured by reduction and elongation. However, high tension steel plate has little elongation capability and is poor in resistance to buckling load. Accordingly, if the bumper reinforcement(a) is worked to obtain a hat-shape as shown in FIG. 8, the sectional shape of the product of reinforcement obtained is as shown in FIG. 9 having insufficiently sections indicated by the letter A. When curvature or diameter is small or bending angle is large, elongation percentage of high tension steel is too small to obtain products of the right shape. In practice, when the material is forcibly elongated, necking is induced and cracks are formed in the product.

In short, a material's percentage of elongation determines its range of formable shapes and makes it difficult to freely design its shape. In addition, when high tension steel must be shaped into a hat-shaped cross-section, a heavy duty or large press having a large workability is necessary.

SUMMARY OF THE INVENTION

The bumper reinforcement of the present invention, has a reinforcement main body made of a long panel having a trough-like cross-section along its whole length. A plurality of ridge-like portions respectively expanding toward an open edge of the long panel are formed on opposing sides of both end portions of the reinforcement main body in order to form curved end of the reinforcement main body. Additionally, parallel beads are formed on the mid-portion of the reinforcement body in order to improve its buckling strength.

The bumper reinforcement of the present invention is manufactured by: forming a reinforcement main body of a long panel having a trough shaped cross-section along its whole length, forming a plurality of beads on opposing sides of the long panel on both end portions of the reinforcement main body so as to be respectively expanding toward an edge of the long panel, and bending the reinforcement main body at both end portions so that the plurality of beads form ridge-like portions at the bent portions of the reinforcement main body. In addition, parallel beads are formed on the mid portion of the bumper reinforcement main body to control anti-buckling strength of the product.

Accordingly, it is one of the purposes of the present invention to provide a bumper reinforcement which may be formed substantially free from any effect of elongation percentage of material which has a desired buckling strength.

It is another purpose of the present invention to provide a manufacturing method for the bumper reinforcement, such that the reinforcement may be formed with little effect of elongation percentage or thickness of the material and such that anti-buckling load strength may be controlled.

Characteristics of the present invention above will be further explained with reference to the drawings.

DESCRIPTION OF THE PREFERRED EMBODIMENTS

One embodiment of the bumper reinforcement according to the present invention will be described with reference to FIG. 1 to FIG. 4.

The bumper 10 for protecting body and chassis of a vehicle when it collides with hard and heavy structure necessitates a bumper reinforcement 1 to be applied to a rear face of a bumper front face or skin made of synthetic resin.

Figure 1:
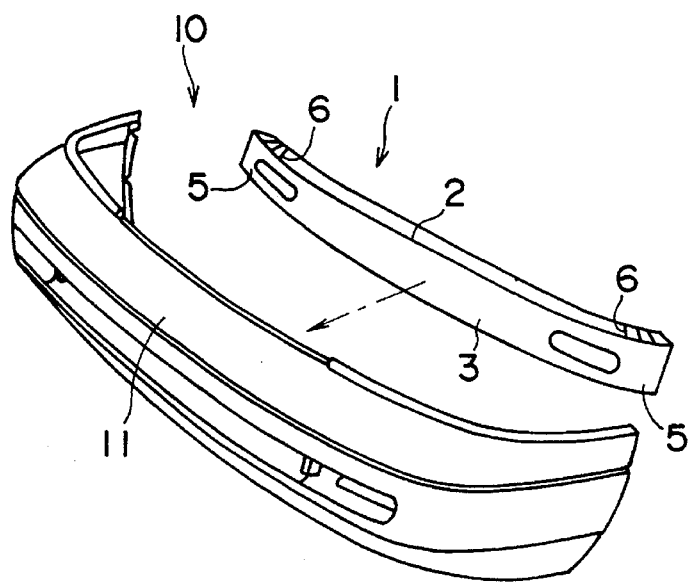
FIG. 1 is an exploded perspective view of a bumper provided with a bumper reinforcement according to one of embodiments of the present invention.
Figure 2:
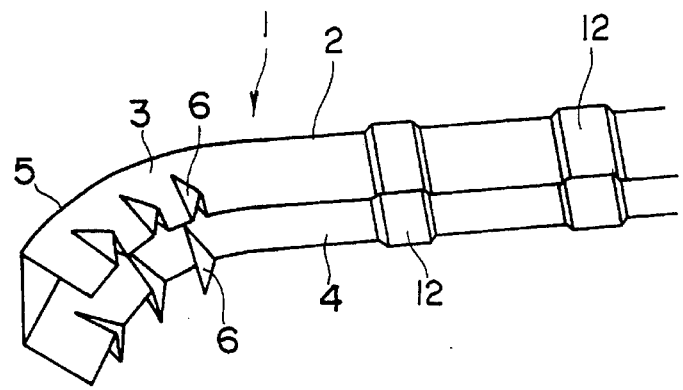
FIG. 2 is a perspective view of the same bumper reinforcement.

As shown in FIG. 1 and FIG. 2, the bumper reinforcement 1 has a reinforcement main body 2 which is made of a long panel 3 having a trough-shaped cross-section along its longitudinal length. Open side 4 of the panel 3 faces the vehicle body.

At opposing ends of the reinforcement main body 2, there are a plurality of ridges 6 respectively expanding toward the open side 4 of the panel 3 and curved portions 5 substantially horizontal and curved toward the open side 4. A pair of plural parallel beads 12 are formed, with a certain separation distance, on upper and lower faces of the mid portion of panel 3 which does not include the end portions of the reinforcement main body 2.

The manufacturing steps for the bumper reinforcement according to the present invention will now be explained.

Figure 3:
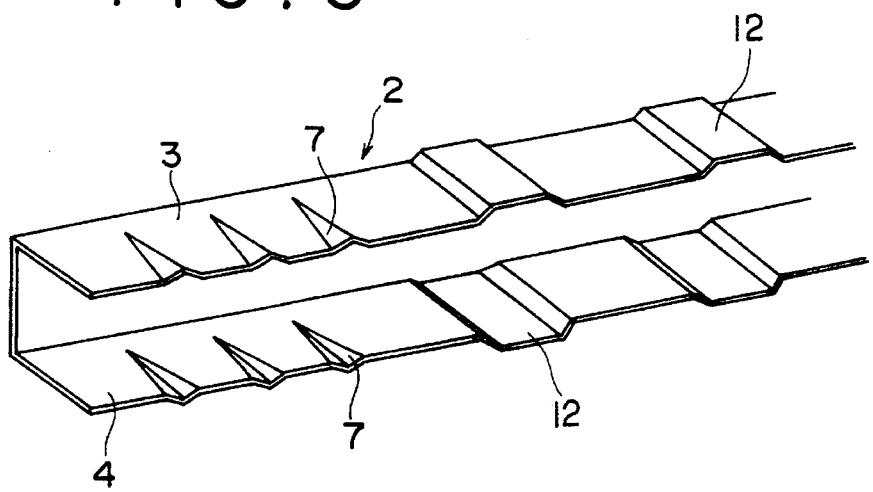
FIG. 3 is a perspective view of the bumper reinforcement at its early steps for forming.
Figure 4A:
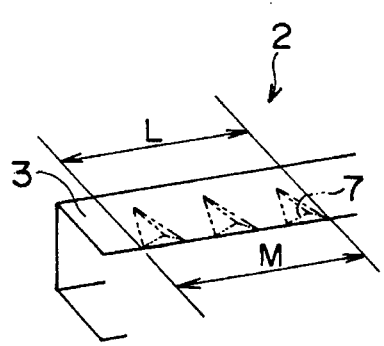
FIG. 4A and FIG. 4B are illustrative views of manufacturing process of the bumper reinforcement of the present invention.

At the same time as forming of the reinforcement main body 2, opposing plural beads 7 respectively expanding toward an open edge 4 as shown in FIG. 3 are formed on the upper and lower parts of the panel 3. At this step, the reinforcement main body 2 is straight and so that outer circumferential length L and inner circumferential length M of the panel 3 are about the same as shown in FIG. 4A.

Figure 4B:
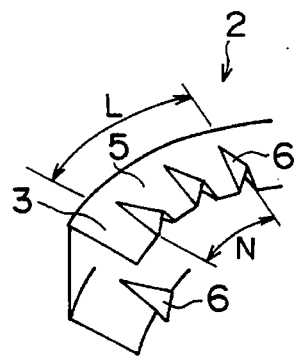

In the next step, as shown in FIG. 4B, parts of the panel 3, in which plural ridges 7 are formed, are bent and these beads 7 become ridges 6 placed on the panel parts. It is noted that the outer circumferential length L does not change substantially. However, the inner circumferential length M shortens and becomes to a new inner circumferential length N. As a result, the difference (L–N) in length is generated between the outer circumferential length L and the inner circumferential length N of the panel part and the reinforcement main body 2 is bent by a predetermined angle generating curved portions 5. Size, shape and pitch or distance of the ridges 6 formed on the curved portions 5 can be freely designed.

According to the present invention, the bending step forms the ridges 6 by folding the beads 7 on the bumper reinforcement main body 2 and shortening the circumferential length M of the panel 3, so that there is almost no necessity to extend the outer circumferential length L of the panel 3. As a result, any material having small elongation percentage, such as high tension steel, can be bent. Consequently, it is possible to employ high tension steel of high strength having a small thickness resulting in low weight and low cost of the product of bumper reinforcements. In addition, anti-buckling strength of the reinforcement main body 2 can be controlled by changing the shape and pitch of plural parallel beads 12 formed on the mid portion of the panel 3.

By changing either the height of the ridges 6, or pitch distance between ridges 6, by changing both the height and pitch of the ridges 6 any curvature of the reinforcement main body 2 can be formed, so that it is not necessary to produce different molds to form products of different curvatures. As a result, it is possible according to the present invention to produce products of different curvatures by a single mold, so that the present invention is suitable to a production method for products having various designs.

Further, because that the end parts of the panel can be bent due to existence of beads 7 formed therein, the power necessary to bend the panel is considerably smaller. As a result, large heavy duty presses are not necessary, thereby lowering production cost. Further, cracks and scars are minimized since a drawing method is not employed in the embodiment of the present invention.

Figure 5:
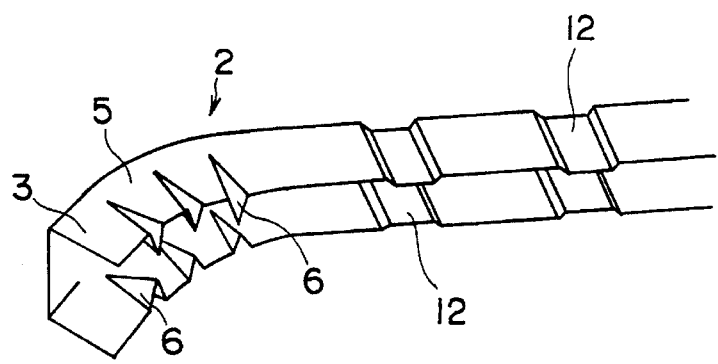
FIG. 5 is a perspective view of a bumper reinforcement according to another one of the embodiments of the present invention.

The ridges 6 and parallel beads 12 may protrude inwardly as shown in FIG. 5. In other words, ridges and beads may protrude outside or inside of the panel 3, and the number of the ridges 6 and beads 12 may be one or plural. Of course, the ridges and beads opposite or alternately to each other.

Further, it is possible to form the reinforcement main body 2 of trough shaped cross-section, backing forming parallel beads 7.

It is also possible to carry out similar bending at places other than end portions 5 of the reinforcement main body 2 and thereby obtain wide range designs or configurations of the reinforcement product.

Figure 6:
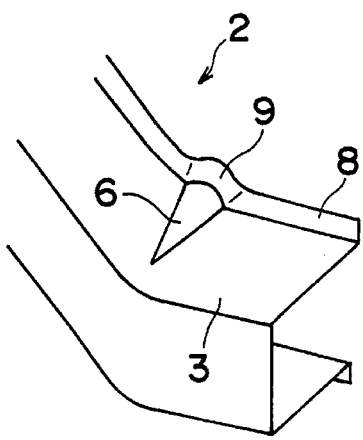
FIG. 6 is a perspective view of an end of the bumper reinforcement of the present invention.
Figure 7:
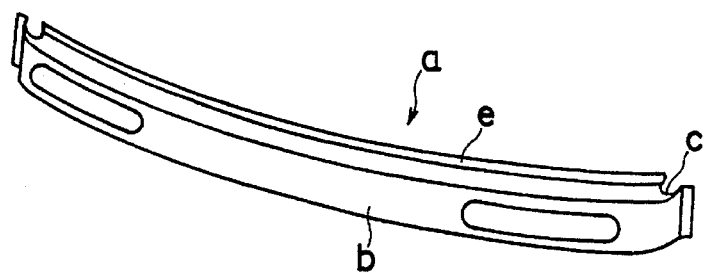
FIG. 7 is a perspective view showing a conventional bumper reinforcement.
Figure 8A:
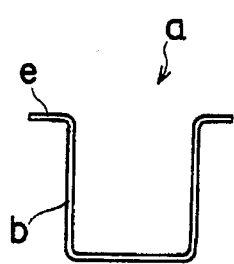
FIG. 8A is a sectional-view depicting the conventional bumper reinforcement.
Figure 8B:
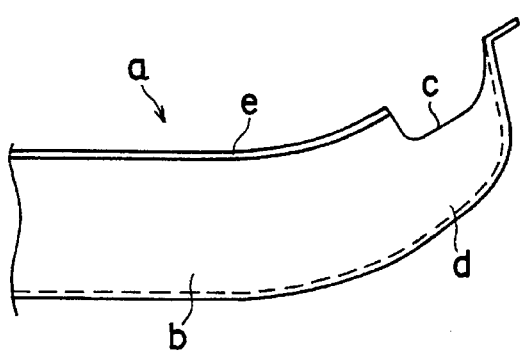
FIG. 8B is a plan view of the conventional bumper reinforcement.
Figure 9:
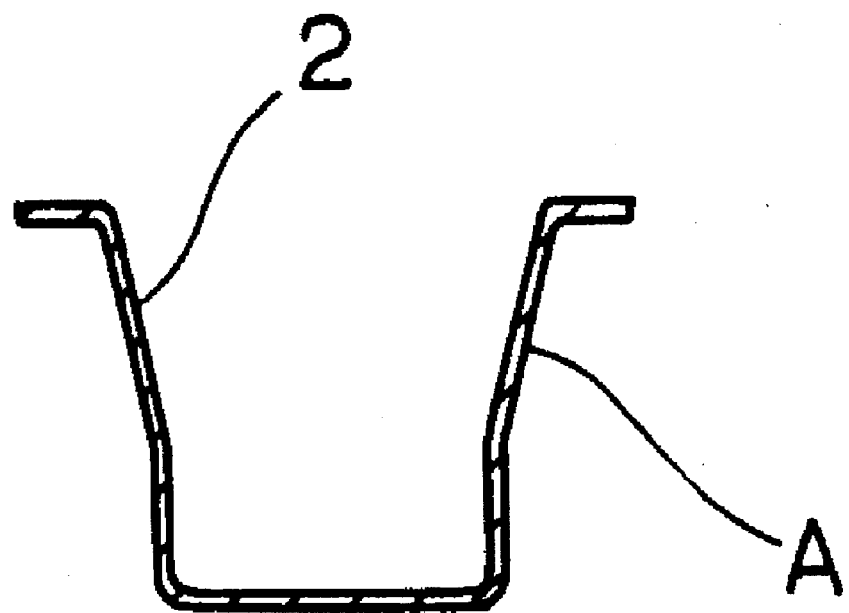
FIG. 9 is a sectional-view of the conventional bumper reinforcement after being formed.

As shown in FIG. 6, the reinforcement main body 2 of a hat-shaped section may have a flange 8 extending along the entire length of the reinforcement main body 2 as well as along the panel 3 having a ridge 6. The flange 8 is deformed in a fan shape 9 in order to curve the entire structure of the reinforcement main body 2. Since the entire length of the main body 2 has the same standard sectional shape. The strength of the bumper reinforcement is improved.

As described in detail above, according to the present invention, the bumper reinforcement has a reinforcement main body made of a long panel having a trough-shaped cross-section along its entire length, and a plurality of ridges respectively expanding toward an open edge of the panel formed on opposing sides of both end portions of the reinforcement main body in order to form curved portions at the end portions. Consequently, it is not necessary to extend the circumferential length of the outer panel part while bending the main body material: It is now also possible to form such a product even when of the reinforcement main body is made of material with low elongation percentage.

Also by forming parallel beads at particular positions between the end portions of the reinforcement main body, anti-buckling strength may be improved.

By changing either height or pitch of the ridges, or both height and pitch of the ridges any curvatures of the bumper may reinforcement may be obtained, so that a single mold installation can be universally or commonly used to produce products of various curvatures. It can be said that the present invention is suitable to produce many different kinds of a product.

Because reinforcement can be ben easily due to existence of the beads therein, power necessary to bend the bland can be lowered. Consequently heavy duty press is not necessary, resulting in low cost of producing the products. Also, in the manufacturing method of the bumper reinforcement of the present invention, the step of drawing may not be necessary and thereby scars are minimized in the final product.

According to the manufacturing method for bumper reinforcement of the present invention, a plurality of beads respectively expanding toward an open edge of the long panel of the reinforcement main body are formed on opposing end portions of the reinforcement main body, the panel having a trough-shaped cross-section along its entire length. These beads are bent to form ridges resulting in curved end portions of the main body without extending the circumferential length of the outer periphery of the curved end portion. The forming process can be carried out without being restricted by the elongation percentage of the product material.

In addition, parallel beads are formed on the mid-portion of the reinforcement main body between its end portions, so that anti-buckling strength can be freely controlled.

The present invention has been described with reference to the preferred embodiment of the bumper reinforcement. However it is understood that it is possible by any person of this field to change or modify the embodiment without departing from the spirit and range of the present invention.

What is claimed is

1. A bumper reinforcement mounted on a rear bumper face of a bumper skin formed by bending both end portions of said reinforcement in the same direction as said bumper skin, comprising:

a reinforcement main body made of a long panel having a trough-shaped cross-section along its entire length, and a plurality of ridges respectively expanding toward an open edge of said long panel, said ridges being formed on opposing sides at both end portions of said reinforcement main body for forming curved end portions of the reinforcement main body which fit the shape of said bumper skin wherein an outer circumferential length of the reinforcement main body having the curved end portions is substantially equal to a length of the reinforcement body before the curved end portions are formed.

2. A bumper reinforcement according to claim 1, further comprising:

parallel beads on opposing sides of said long panel on a mid-portion of said reinforcement main body for controlling anti-buckling strength.

3. A manufacturing method for a bumper reinforcement, comprising the steps of:

making a reinforcement main body from a long panel, having a trough-shaped cross-section along its whole length;

forming a plurality of beads, respectively expanding toward an edge of said long panel, on opposing sides of said long panel on both end portions of said reinforcement main body; and bending said reinforcement main body at both end portions so that said plurality of beads form ridges in the bent portions of said reinforcement main body.

4. The manufacturing method for bumper reinforcement according to claim 3, further comprising the step of forming parallel beads on opposing sides of a mid portion of said reinforcement main body, wherein said parallel beads control anti-buckling strength of the bumper reinforcement.

* * * * *